United States Patent
Lippey et al.

(10) Patent No.: US 10,397,558 B2
(45) Date of Patent: Aug. 27, 2019

(54) FORMING SPECTRAL FILTERS (75) Inventors: Barret Lippey, Belmont, MA (US); Charles R. Barker, III, Framingham, MA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1717 days.

(21) Appl. No.: 12/606,629

(22) Filed: Oct. 27, 2009

(65) Prior Publication Data
US 2010/0039352 A1 Feb. 18, 2010

Related U.S. Application Data (63) Continuation of application No. 11/398,376, filed on Apr. 5, 2006, now abandoned.

(51) Int. Cl.
| | |
|---|---|
| *G02B 27/22* | (2006.01) |
| *H04N 13/334* | (2018.01) |
| *H04N 13/324* | (2018.01) |
| *G02B 5/28* | (2006.01) |
| *G02C 7/00* | (2006.01) |

(52) U.S. Cl.
CPC ........... *H04N 13/334* (2018.05); *G02B 5/285* (2013.01); *G02B 27/22* (2013.01); *G02B 27/2207* (2013.01); *G02C 7/00* (2013.01); *H04N 13/324* (2018.05); *H04N 2213/008* (2013.01)

(58) Field of Classification Search
CPC .................................................. H04N 13/0422
USPC ................ 359/464, 581; 351/159, 163, 165; 348/60; 353/7
See application file for complete search history.

(56) References Cited

U.S. PATENT DOCUMENTS

| | | | |
|---|---|---|---|
| 4,290,675 A * | 9/1981 | Beiser ........................... | 396/324 |
| 5,028,121 A | 7/1991 | Baur et al. | |
| 5,042,921 A | 8/1991 | Sato et al. | |
| 5,074,645 A | 12/1991 | Gold et al. | |
| 5,218,386 A * | 6/1993 | Levien ........................... | 351/163 |
| 5,537,476 A * | 7/1996 | Coteus et al. ................... | 380/54 |
| 5,552,840 A | 9/1996 | Ishii et al. | |
| 5,774,201 A * | 6/1998 | Tackles ........................ | 351/159 |
| 6,142,624 A * | 11/2000 | Morris et al. ................. | 351/159 |
| 6,164,777 A | 12/2000 | Li et al. | |
| 6,276,801 B1 | 8/2001 | Fielding | |
| 6,280,034 B1 | 8/2001 | Brennesholtz | |
| 6,283,597 B1 | 9/2001 | Jorke | |
| 6,309,071 B1 | 10/2001 | Huang et al. | |
| 6,650,377 B2 | 11/2003 | Robinson et al. | |
| 6,672,722 B2 | 1/2004 | O'Connor et al. | |
| 6,698,890 B1 * | 3/2004 | Jorke ................................ | 353/7 |

(Continued)

FOREIGN PATENT DOCUMENTS

| | | |
|---|---|---|
| CN | 2550793 Y | 5/2003 |
| DE | 19924167 A1 | 12/2000 |

(Continued)

OTHER PUBLICATIONS

CN Office Action dated Jan. 8, 2010 for CN Appl. No. 200780017015.7.

(Continued)

*Primary Examiner* — Audrey Y Chang (57) ABSTRACT

A lens bears a plurality of roll-coated layers to pass, to one eye of a viewer, a first image, in a first band of wavelengths, that is appropriate for 3D viewing of a stereoscopic image.

14 Claims, 9 Drawing Sheets

(56) References Cited

U.S. PATENT DOCUMENTS

| | | | |
|---|---|---|---|
| 6,777,070 | B1 | 8/2004 | Murata et al. |
| 6,846,567 | B1* | 1/2005 | Ekinaka .................. C08J 7/042 |
| | | | 428/39 |
| 6,945,654 | B2 | 9/2005 | Newell et al. |
| 6,958,191 | B2 | 10/2005 | Yamaguchi et al. |
| 6,972,722 | B2 | 12/2005 | Katoh et al. |
| 6,972,810 | B2 | 12/2005 | Magarill et al. |
| 7,052,770 | B2* | 5/2006 | Furuya et al. ................. 428/447 |
| 7,241,014 | B2 | 7/2007 | Lippey et al. |
| 7,311,938 | B2 | 12/2007 | Koenig et al. |
| 2001/0028416 | A1 | 10/2001 | Divelbiss et al. |
| 2003/0003295 | A1* | 1/2003 | Dreher ............... B29C 35/0805 |
| | | | 428/332 |
| 2004/0233524 | A1 | 11/2004 | Lippey et al. |
| 2006/0011617 | A1 | 1/2006 | Covarrubias et al. |
| 2008/0252845 | A1* | 10/2008 | Dreher ............... B29C 35/0805 |
| | | | 351/159.02 |

FOREIGN PATENT DOCUMENTS

| | | | |
|---|---|---|---|
| DE | 20 2005001077 U1 | 3/2005 | |
| DE | 10359788 A1 | 4/2005 | |
| JP | 05065440 A | 3/1993 | |
| JP | 10160902 A | 6/1998 | |
| JP | 11-281931 | 10/1999 | |
| JP | 2002350610 A | 12/2002 | |
| JP | 2002359792 A | 12/2002 | |
| JP | 2003264853 A | 9/2003 | |
| JP | 2003316278 A | 11/2003 | |
| JP | 2004513388 A | 4/2004 | |
| JP | 2004333561 A | 11/2004 | |
| WO | 2000/23845 A2 | 4/2000 | |
| WO | 2002/32149 A2 | 4/2002 | |
| WO | 20021076107 A1 | 9/2002 | |
| WO | 20041038457 A2 | 5/2004 | |
| WO | 20051039192 A1 | 4/2005 | |
| WO | 20051109091 A2 | 11/2005 | |
| WO | 20061004342 A1 | 1/2006 | |
| WO | 20061016315 A1 | 2/2006 | |

OTHER PUBLICATIONS

Japanese Office Action dated Jul. 3, 2012 for JP Application No. 2009-504443.
EP communication dated Mar. 28, 2012 for EP Application No. 07 760 079.9-1241.
CN Decision of Rejection dated Apr. 6, 2012 for CN Appln. No. 200780017015.7.
International Search Report and Written Opinion dated Sep. 15, 2006 from International Application No. PCT/US2005/043623.
International Preliminary Report on Patentability dated Jun. 5, 2007 from International Application No. PCT/US2005/043623.
International Search Report and Written Opinion dated Nov. 13, 2007 from International Application No. PCT/US2007/065858.
International Preliminary Report on Patentability dated Apr. 11, 2008 from International Application No. PCT/US2007/065858.
International Search Report and Written Opinion dated Feb. 22, 2008 from International Application No. PCT/US2007/065937.
Woods, et al., "Ghosting in anayglyphic steroscopic images", Porceedings of the SPIE, 529(1):354-365, 2004. Abstract only (IEE Database Accession No. 8283259).

* cited by examiner

| Material | Thickness (nm) | |
|---|---|---|
| | Left Eye | Right Eye |
| SiO₂ | 274 | 298 |
| Nb₂O₅ | 64 | 70 |
| SiO₂ | 131 | 142 |
| Nb₂O₅ | 106 | 116 |
| SiO₂ | 99 | 107 |
| Nb₂O₅ | 105 | 115 |
| SiO₂ | 105 | 113 |
| Nb₂O₅ | 65 | 71 |
| SiO₂ | 105 | 114 |
| Nb₂O₅ | 60 | 66 |
| SiO₂ | 86 | 93 |
| Nb₂O₅ | 123 | 135 |
| SiO₂ | 89 | 96 |
| Nb₂O₅ | 103 | 112 |
| SiO₂ | 120 | 131 |
| Nb₂O₅ | 65 | 71 |
| SiO₂ | 105 | 114 |
| Nb₂O₅ | 54 | 59 |

(cont.)

| Material | Left Eye | Right Eye |
|---|---|---|
| SiO₂ | 89 | 96 |
| Nb₂O₅ | 49 | 54 |
| SiO₂ | 193 | 209 |
| Nb₂O₅ | 69 | 75 |
| SiO₂ | 162 | 175 |
| Nb₂O₅ | 76 | 83 |
| SiO₂ | 120 | 130 |
| Nb₂O₅ | 55 | 60 |
| SiO₂ | 89 | 96 |
| Nb₂O₅ | 54 | 59 |
| SiO₂ | 87 | 94 |
| Nb₂O₅ | 23 | 26 |
| SiO₂ | 33 | 36 |
| Nb₂O₅ | 58 | 63 |
| SiO₂ | 157 | 170 |
| Nb₂O₅ | 83 | 90 |
| SiO₂ | 151 | 163 |
| Nb₂O₅ | 54 | 59 |

FORMING SPECTRAL FILTERS

CLAIM OF PRIORITY

This application is a continuation of, and claims priority of, U.S. application Ser. No. 11/398,376, filed Apr. 5, 2006, incorporated herein by reference in its entirety.

BACKGROUND

This description relates to forming spectral filters.

Stereoscopic projection, commonly called three-dimensional (3D) projecting, delivers slightly different images to each eye of a viewer, which gives the illusion of depth when the viewer's brain assembles the two images into a single scene.

In a polarization-based 3D projection system, two projectors are used, one for each eye, and polarizing filters are used to polarize the light from each projector orthogonally to the other. The viewer wears glasses with corresponding polarizing filters, so that each eye receives only light projected from the corresponding projector.

In anaglyphic projection, the two images are each color-shifted, one into the red end of the visible spectrum and one into the blue end. The viewer wears glasses with red and blue filters, one for each eye, so that each eye sees only the image shifted into the corresponding color. The viewer's brain reassembles the two images into a single reduced-color image with the illusion of depth. Such a system also works with still images, which can be printed with the two color-shifted images overlaid.

A third approach projects alternating images for each eye, and glasses, for example with LCD shutters, actively block the view of the eye opposite the image currently being projected.

SUMMARY

In general, in one aspect, a lens bears a plurality of roll-coated layers to pass, to one eye of a viewer, a first image, in a first band of wavelengths, that is appropriate for 3D viewing of a stereoscopic image.

Implementations may include one or more of the following features. The lens includes layers adhered to a substrate in a roll-coating process and having optical properties and thicknesses such that the combination of the layers transmits light within the first band of wavelengths and does not transmit light within a second band of wavelengths. The optical properties and thicknesses of the layers are such that the combination of the layers transmits light with a third and fourth band of wavelengths and does not transmit light within a fifth and sixth band of wavelengths. A second lens bears a roll-coated layer to pass, to a second eye of a viewer, a second image, in a second band of wavelengths, that is complementary to the first image for 3D viewing of the stereoscopic image. The first band of wavelengths includes a band of wavelengths around 435 nm. The second band of wavelengths includes a band of wavelengths around 475 nm. The third band of wavelengths includes a band of wavelengths around 510 nm, the fourth band of wavelengths includes a band of wavelengths around 610 nm, the fifth band of wavelengths includes a band of wavelengths around 550 nm, and the sixth band of wavelengths includes a band of wavelengths around 660 nm.

The lens includes a substrate sheet having curvature, the roll-coated layer having a generally uniform thickness normal to the sheet at points along the curvature. The curvature is such that when the lens is positioned near a person's face, points along a surface of the lens, in one plane, are a relatively uniform distance from the eye of the viewer. The curvature has a radius of curvature such that when the lens is positioned near a person's face, the radius is approximately equal to the distance between the coating and the center of the eye. The radius of curvature is between about 1.27 cm. (½ inch) and 10.26 cm (4 inches).

In general, in one aspect, a set of glasses includes a frame to hold two lenses. A first lens includes a roll-coated filter to pass light in a first set of bands of wavelengths and reflect light in a second set of bands of wavelengths. A second lens includes a roll-coated filter to pass light in a portion of the second set of bands of wavelengths and reflect light in a portion of the first set of wavelengths.

In general, in one aspect, glasses to view a stereoscopic image include a first lens bearing a roll-coated optical layer to pass, to one eye of a viewer, a first image that is appropriate for 3D viewing of the stereoscopic image. A second lens bears a roll-coated optical layer to pass, to a second eye of a viewer, a second image that is complementary to the first image for 3D viewing of the stereoscopic image.

In general, in one aspect, glasses to view a 3D frame or video presentation include a supporting structure and a pair of curved lenses. Each lens bears layers having a substantially constant thickness normal to a surface of the lens. The layers are configured to filter images of the presentation projected in two non-overlapping bands of wavelengths of light as they are viewed through the lenses, to produce a 3D impression for a viewer the lenses each having a radius of curvature between about 1.27 cm. (½ inch) and 10.26 cm (4 inches).

In general, in one aspect, a first lens includes roll-coated layers of materials selected to transmit light having a first set of wavelengths, and a second lens includes roll-coated layers of materials selected to transmit light having a second set of wavelengths.

In general, in one aspect, a lens passes, to one eye of a viewer, a first image, in a first wavelength, that is appropriate for 3D viewing of a stereoscopic image.

Implementations may include one or more of the following features. A second lens passes, to a second eye of the viewer, a second image, in a second wavelength, that is complementary to the first image for 3D viewing of the stereoscopic image. The lens includes a substrate sheet and a layer having stress, in which the curvature of the lens is a result of the stress. The first and second lenses are arranged so that when worn by a viewer while viewing a projection on a domed screen, light from any point on the dome passes through each lens at an angle of incidence near perpendicular to the surface of the lens.

In general, in one aspect, alternating layers of at least a first and second material having different optical properties are roll-coated onto a substrate. Alternating layers of at least the first and second materials are roll-coated onto a second substrate. Thicknesses of the layers are selected so that in combination, the layers on the first substrate will transmit light having a first set of wavelengths and not transmit light having a second set of wavelengths, and the layers on the second substrate will transmit light having the second set of wavelengths and not transmit light having the first set of wavelengths. A portion of each of the first and second coated substrates is removed, and the portions are assembled into a frame configured to position the portions, one near each eye of a wearer when the frame is worn on the head of the wearer.

Implementations may include one or more of the following features. The first material is Silicon Dioxide (SiO2). The second material is Niobium Pentoxide (Nb2O5), Titanium Dioxide (TiO2) or Tantalum Pentoxide (Ta2O5). A property of at least one layers is selected so that the combination of the layers has a stress, in which the stress causes the substrate to exhibit a curvature. A first piece is cut from the first coated substrate to form a first lens, a second piece is cut from the second coated substrate to form a second lens, and the first and second lenses are arranged to form a set of glasses.

Advantages include the ability to manufacture lenses for a large number of glasses in a single process and for low per-item cost. Lenses can be curved to properly filter the complete field of view of the wearer.

Other features and advantages will be apparent from the description and from the claims.

BRIEF DESCRIPTION OF DRAWINGS

FIGS. 2A-2G and 6 are spectral graphs.

DETAILED DESCRIPTION

Figure 1:
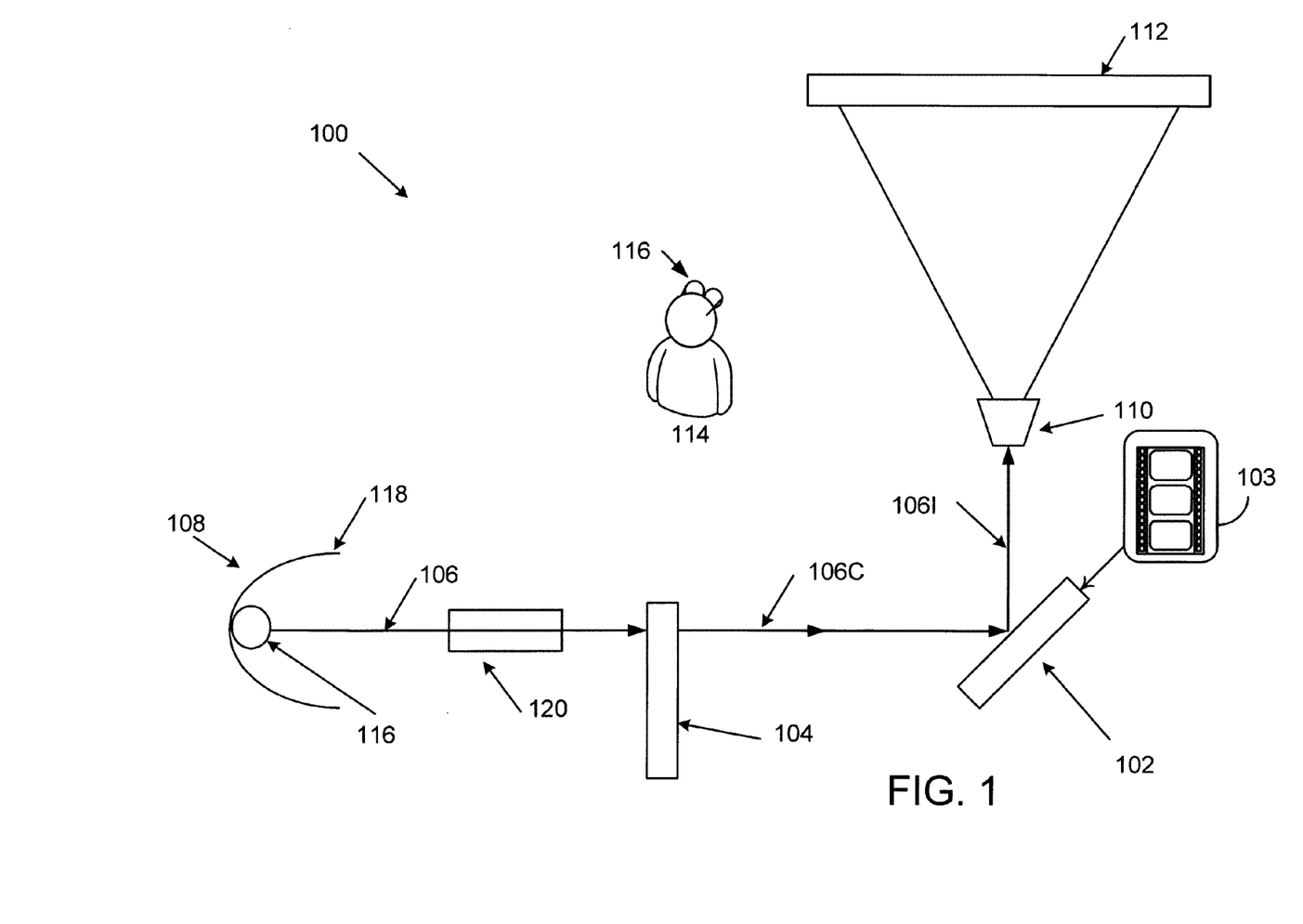
FIG. 1 is a block diagram of a projector.

In a typical digital projection system, for example system 100 in FIG. 1, a full-color image is created by generating three single-color component images that are simultaneously or sequentially projected to resolve into a single, full-color image when viewed by the audience. A single imaging device 102, produces the component images based on an incoming video stream 103 using light received from a color wheel 104 that rotates red, green, and blue filters into the path of light 106 projected from a spread-spectrum (white) light source 108, producing colored light 106C. In some examples, the light sources include a bulb 116, a reflector 118, and a homogenizing device 120. The homogenizing device 120, for example, a light pipe, makes sure that the light reaching the color wheel 104 is uniform in brightness and color. The imaging device 102 could be a reflective device, such as a DLP light valve, or a transmissive device, such as an LCD panel (with appropriate changes to the layout of the projection system 100).

The filtered and imaged light 1061 is then focused by a lens 110 onto a projection screen 112, to be seen by a viewer 114. As long as the imaging source 102 and color wheel 104 switch between component images and colors at the proper rate, the viewer 114 will perceive a single, full-color image. For example, to produce a full color image at 30 frames per second (fps), the imaging device must produce at least 90 single-color frames per second. The actual rate will depend on the frame-rate of the source material, the number of color segments in the wheel 104, and the rate at which the wheel spins. For example, some projectors have more than three segments and spin the wheel 2, 4, or 8 times faster than the minimum needed, according to the number of segments. In some examples, three separate colored light sources are used or three imaging devices are used, one for each color. Each of these approaches can be combined with the others in various ways, for example, to project all three color components simultaneously.

Figure 2A:
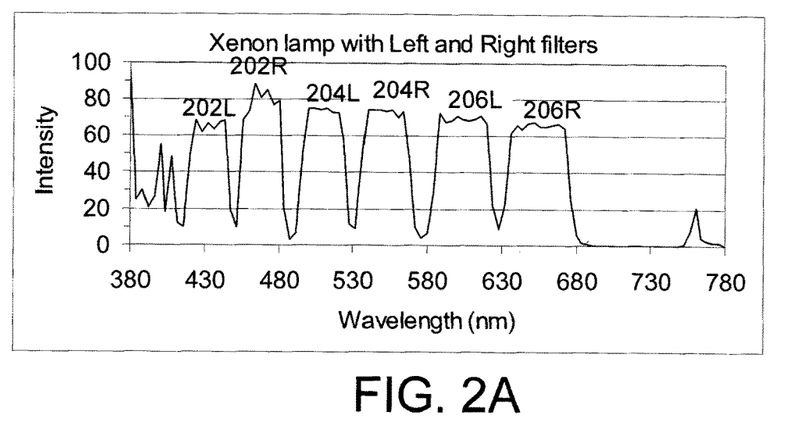
Figure 2B:
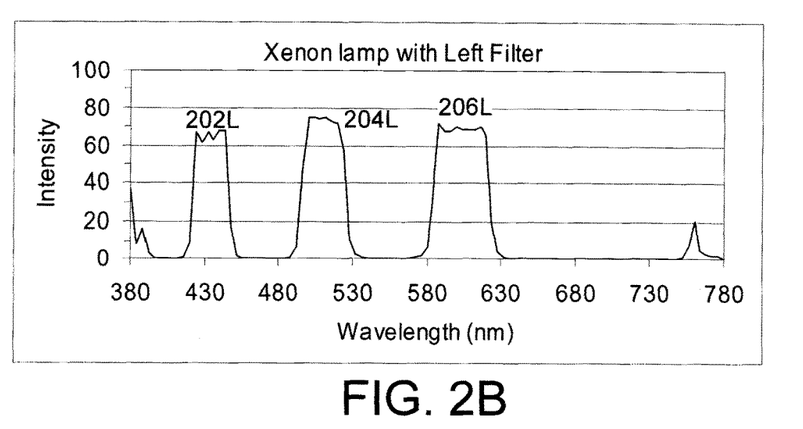
Figure 2C:
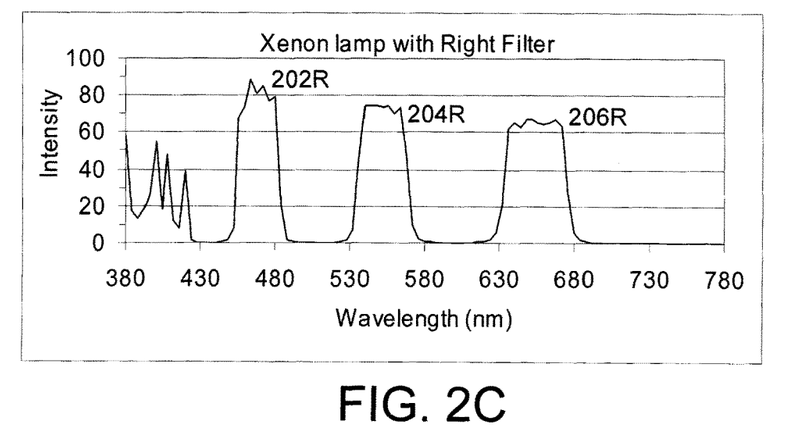
Figure 2D:
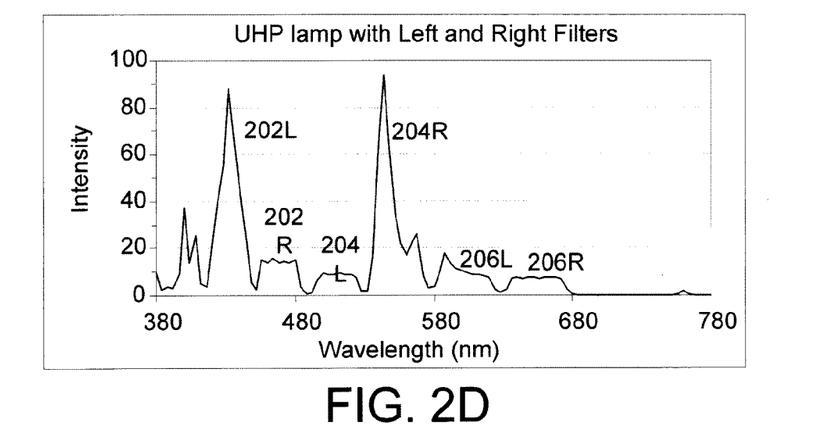
Figure 2E:
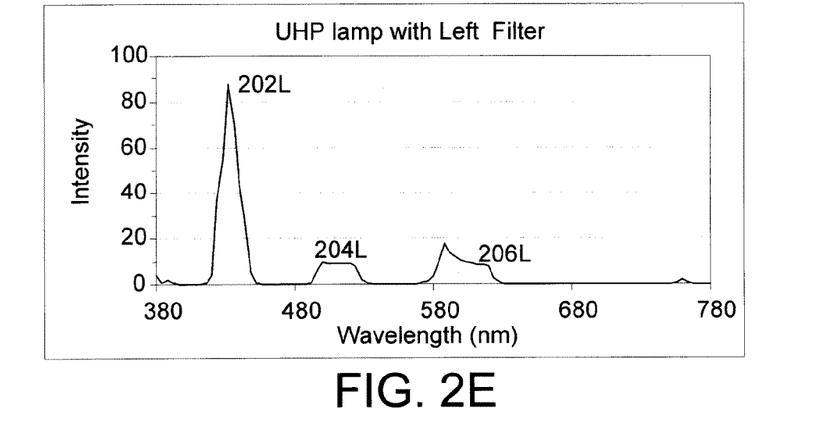
Figure 2F:
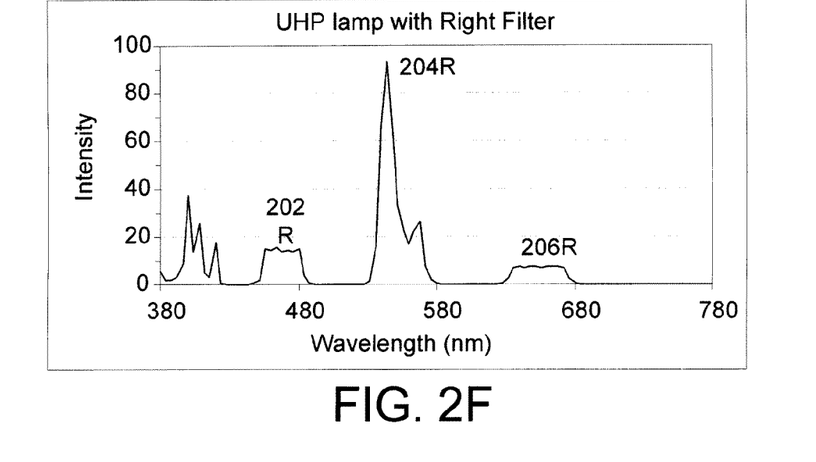
Figure 2G:
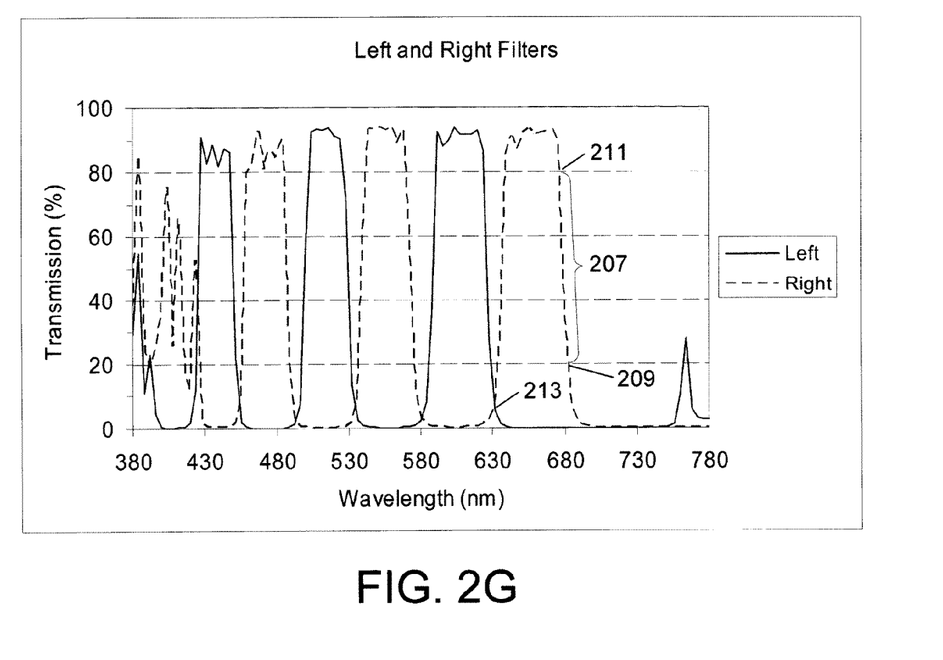

A type of 3D projection is described, for example, in U.S. Pat. No. 6,283,597. Rather than polarize the images for each eye or shift each into a completely different color, the individual red, green, and blue components of each left- and right-eye image are constrained to a narrow band of that color, different for each eye, such that filters can be used to allow only the correct image to reach each eye while still allowing each eye's image to be composed of all three colors. FIGS. 2A and 2D show example sets of filtered color bands for two commonly used light sources. Xenon lamps are commonly used in cinema projection, while UHP (ultra high performance) mercury arc lamps are commonly used in home projectors. Images for the left eye are filtered inside the projector into bands 202L, 204L, and 206L, shown separately in FIGS. 2B and 2E, while images for the right eye are filtered inside the projector into bands 202R, 204R, and 206R, shown separately in FIGS. 2C and 2F. In each graph, the intensity values are normalized to 100 representing the potential intensity of unfiltered light. The transmission rates of the filters, independent of light source, are shown in FIG. 2G. Filters in the viewer's glasses transmit the appropriate bands for each eye, while blocking the bands used for the other eye. For good image separation, the bands for the left and right eye should not overlap, meaning that the bands do not have any wavelengths in common above approximately five percent of peak intensity, e.g., above point 213 in FIG. 2G.

For this type of projection, a similar projection system to that shown in FIG. 1 can be used. Instead of the color filter wheel 104 having three colors, it has six, corresponding to the six bands 202L, 204L, 206L, 202R, 204R, and 206R. Alternatively, the three-color wheel can still be used, with a second filter or set of filters used to split each color into the two appropriate bands. In such a system, the image source produces six images per frame, i.e., red, blue, and green components for each eye. The viewer 114 wears glasses 116 with filters that allow each eye to see the three bands used for the corresponding image. Such a system has advantages of providing a full-color stereoscopic image over a wider viewing angle than systems using polarized light.

Such projectors are discussed in co-pending application Two-Dimensional and Three-Dimensional Projecting of Barret Lippey, filed on the same day as this application, and incorporated here by reference.

As mentioned above, to view a three-color 3D projection, the viewer wears glasses with lenses including filters that allow each eye to see the three color-bands used for the corresponding image and not those used for the complementary image meant for the other eye. One way to produce such a lens uses a batch-coating process to produce each lens as a distinct unit.

Roll-coating can produce complex optical filters inexpensively on thin, flexible substrates. A roll-coating process involves coating a series of thin layers of different materials on a substrate. Whereas a batch process typically coats on individual, small pieces of glass or plastic that are not flexible, the roll coating process can deposit coatings onto a roll of flexible plastic web that is continuously passing through the coating chamber. One substrate material that may be used is PET (polyethylene terephthalate), because of its strength, low outgassing, high heat resistance, and low cost. The PET substrate can be approximately 0.127 mm (0.005 inches) to 0.381 mm (0.015 inches) thick. The width of the substrate is typically about 0.30 m (1 foot) to 1.83 m (6 feet). Other possible substrate materials include polycarbonate, polymethyl methacrylate and transparent polyimide. Thin rolls of these polymeric materials are flexible enough to be bent around a radius of approximately 2.54 cm (1 inch) without stress failure.

Figure 3:
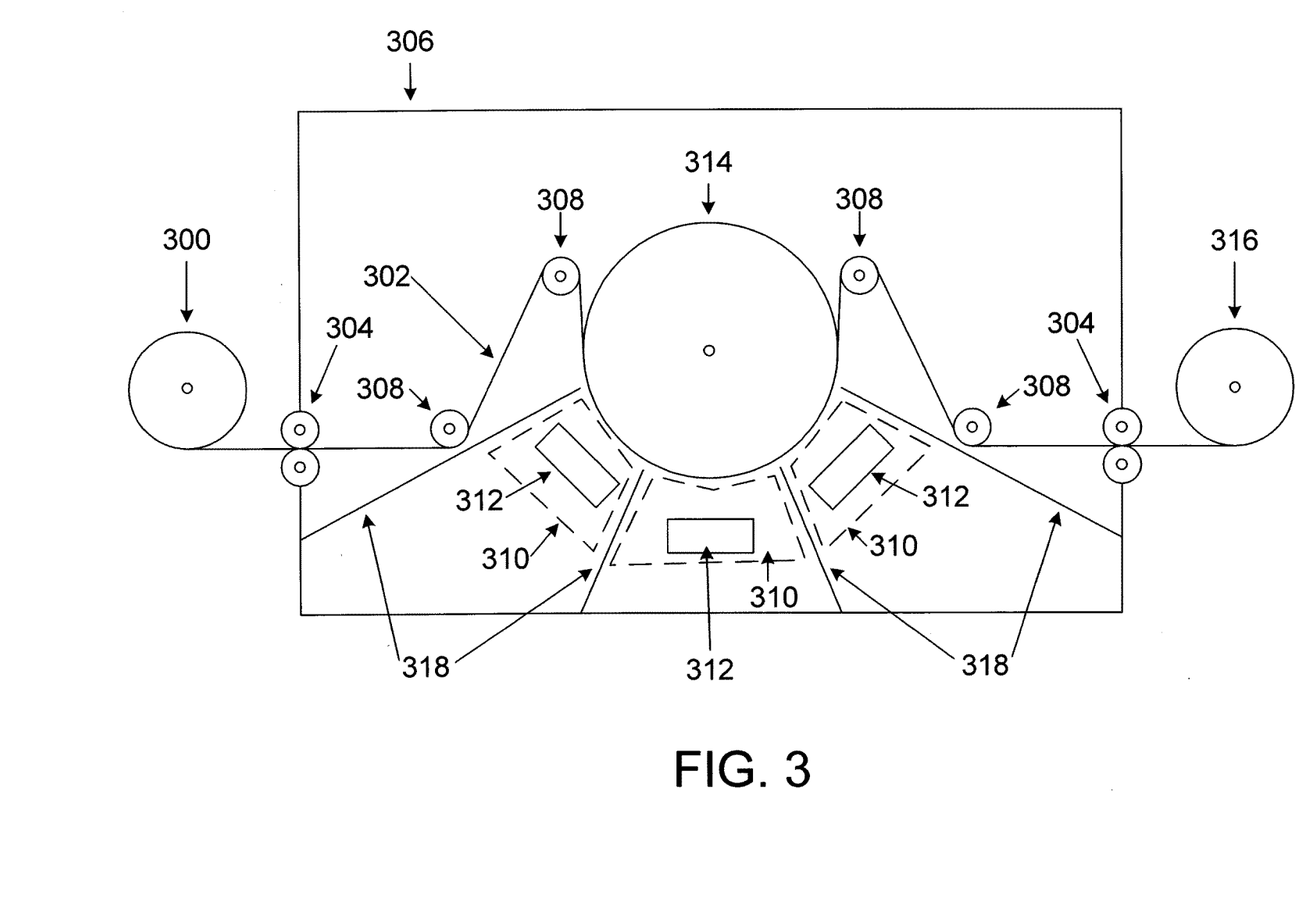
FIG. 3 is a block diagram of a roll-coating machine.

As shown in FIG. 3, a large roll 300 of the plastic film to be used as a substrate is mounted on one end of the machine. The substrate 302 is fed through a vacuum lock 304 into the coating chamber 306 which is kept at low pressure. As a transport mechanism 308 moves the substrate 302 through the coating chamber 306, thin layers of optical materials are sputtered or evaporated onto the substrate 302 as it passes in front of successive deposition zones 310 with sputter or evaporation targets 312. The substrate 302 is stretched over a large drum 314 during deposition so that it stays flat and the heat of deposition can be removed through the drum. The substrate then passes through another vacuum lock 304 and is wound onto another roll 316. A new roll 300 can be spliced onto the end of a previous roll that runs out. The machine may be designed to be run without stopping until maintenance is needed. Typical maintenance includes replacing sputter or evaporation targets 312, cleaning shields 318, and replacing worn-out equipment. For complex coatings, the substrate 302 may need to be run through the machine multiple times. Back and forth motion of the substrate through the deposition zones can be used if the plastic-film transport mechanism 308 allows it.

The rolls can weigh up to several hundred pounds each and can be many thousands of feet long. Because roll coating can be performed continuously without breaking vacuum or needing lengthy pump-down each time substrates are loaded, the throughput of roll coating can be much higher than batch processing and the resultant cost of roll coating can be much lower. After the roll-coating process, individual pieces are cut out of the substrate and assembled into glasses. The individual pieces can be used as lenses themselves, held in place by the frame of the glasses, or they can be laminated onto more substantial glass or plastic lenses.

Each of the layers of optical material has certain optical properties (e.g., alternating layers of high refractive index and low refractive index), and the combination of the layers is designed to produce the filtering characteristics desired for a particular application. In the case of triple bandpass filters for 3D glasses, the goal is to have a high transmission of the bands for each eye and high rejection of other light, including the bands used for the opposite eye, as shown in FIGS. 2B and 2C. FIG. 2B shows the transmission rate in the three bands 202L, 204L, and 206L used for the left eye, and FIG. 2C shows the transmission rates in the three bands 202R, 204R, and 206R used for the right eye. The steep sides of the peaks representing the bands are desirable to reduce any bleeding over of light from the complementary bands, a problem referred to as cross-talk.

Figure 4:
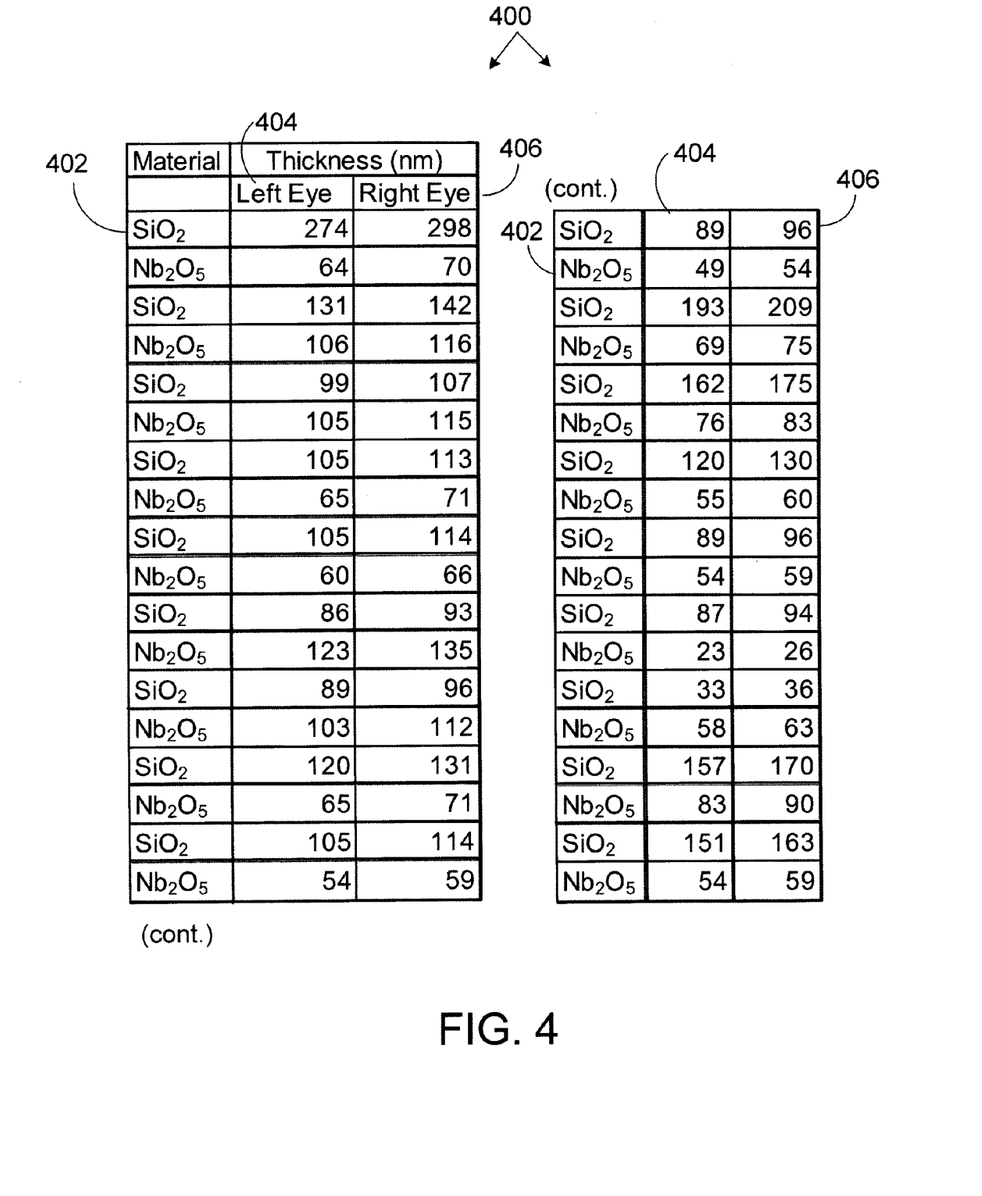
FIG. 4 is a table describing a coating design.

An example of a triple bandpass filter design is shown in FIG. 4. Table 400 lists the materials in column 402 and their thicknesses in columns 404 and 406. The calculated spectral performance of the thicknesses listed in column 404, for the left eye, is the basis of FIG. 2B. By increasing the coating thickness of every layer by about 8%, the spectral curve of the coating can be shifted to longer wavelengths to make the corresponding filter for the right eye, as shown in column 406 and FIG. 2C. The amount of the shift in wavelength is equal to the amount of increase in coating thickness, so the amount should be selected to shift each pass band 202L, 204L, 206L far enough that the shifted bands 202R, 204R, 206R do not overlap the original ones. It has been found that for good performance, average transmission in the pass-bands 202L, etc., should be approximately 80% or greater, and the average transmission in the blocking bands, that is, for wavelengths outside the pass-bands, should be approximately 0.5% or less. The slopes of the band edges, e.g., edge 207 in FIG. 2G, between the points 209, 211 where 20% and 80% of the available light is transmitted for each pass-band, should be approximately 1% of the center wavelengths of the respective bands. By slope, we mean the spacing of the endpoints of a transition band between a pass band and a stop band as a percentage of the width of the center of the wavelength band. The wavelength tolerance of each band (that is, the tolerance by which the wavelength of the center of the wavelength band may vary) should be less than approximately 2% on either side of the nominal center wavelength of the band.

Filters made by this process can be used in both the glasses worn by a viewer and as the filters within the projector itself, with appropriate adjustments made for the geometry of the projector, for example, if light is incident on the filters at some angle other than zero degrees within the projector.

Figures 5A, 5B:
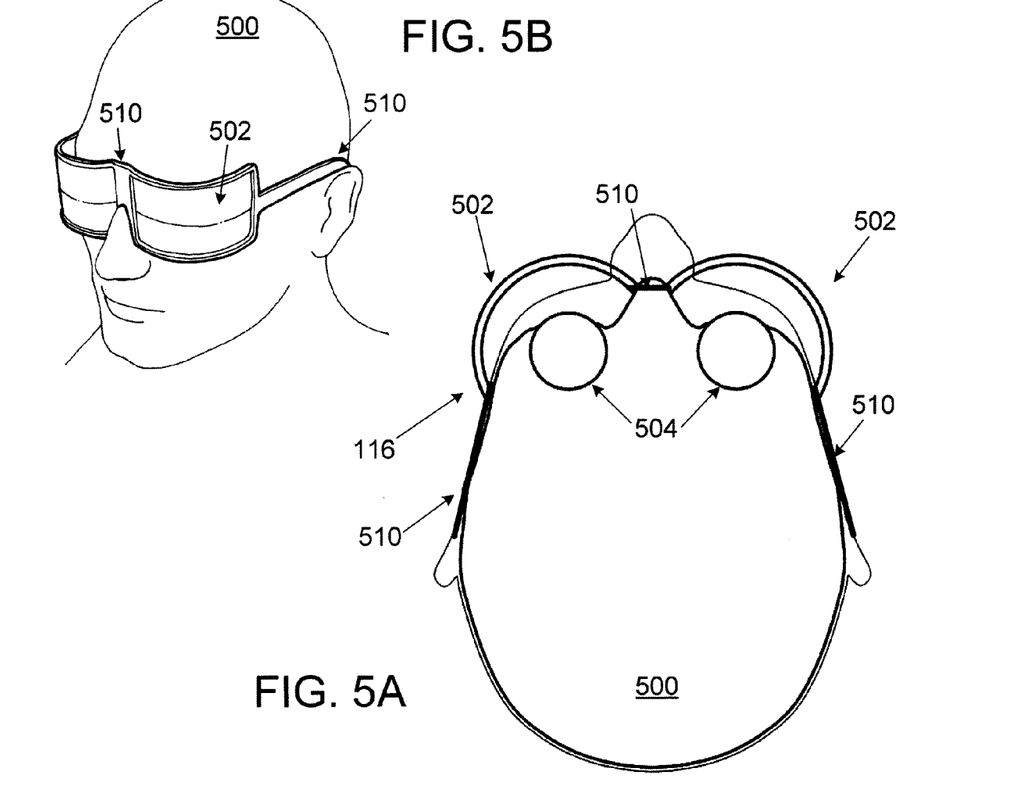
FIG. 5A is a sectional top view of glasses on a wearer's head.
FIGS. 5B and 5F are perspective view of glasses on a wearer's head.

In some examples, because the substrate used in the roll-coating process is a thin flexible sheet of plastic, the filters used for the glasses can easily be curved into a cylindrical shape, as shown in FIG. 5A. Once shaped, the filters can be held in the desired shape by the frame 510 of the glasses 500. Alternatively, they could be laminated onto a glass or plastic lens having the desired shape. This flexibility provides an advantage over batch-coated processes, as it allows a uniform coating over a curved surface, since the surface is kept flat during the coating process. Roll coating using sputtering or evaporation is a directional coating process in which the material being deposited moves in a straight line from the source to the substrate. This results in a uniform coating on a flat surface with appropriate masking and process control. Thickness uniformity should be within about +/−2% to achieve the tolerances on bands discussed above. Other coating methods, for example chemical vapor deposition, that can coat highly curved surfaces because they are non-directional tend to be expensive compared to sputtering or evaporation. Since roll-coating works with a flexible substrate, it allows inexpensive directional coating processes to be used to create curved lenses.

Figure 5C:
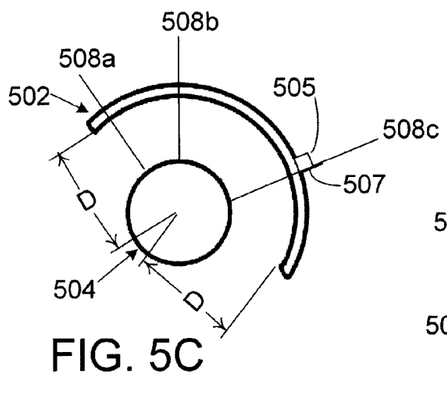
FIGS. 5C and 5D are sectional plan views of lenses and eyes.
Figure 5D:
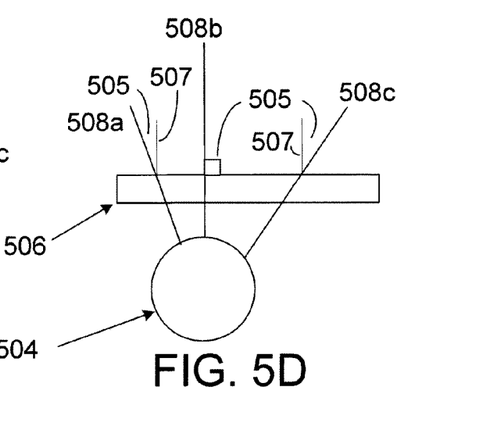
Figure 6:
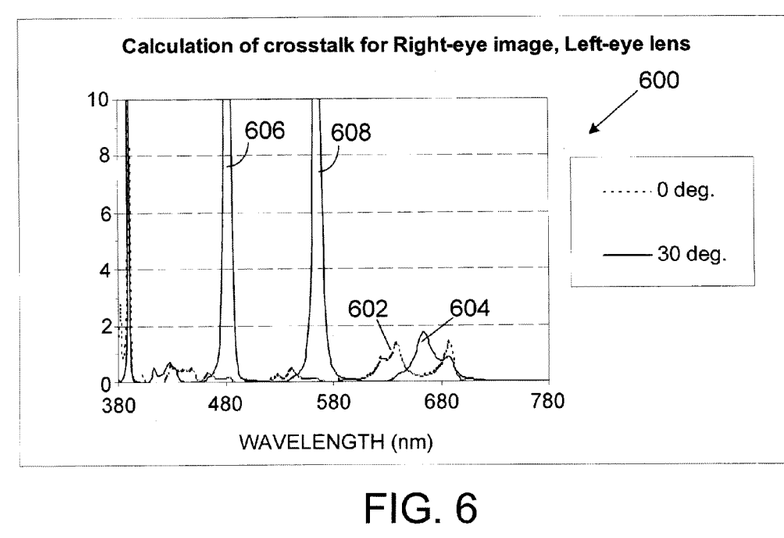
FIG. 6 shows calculation of crosstalk for right eye image, left-eye lens.
Figure 7:
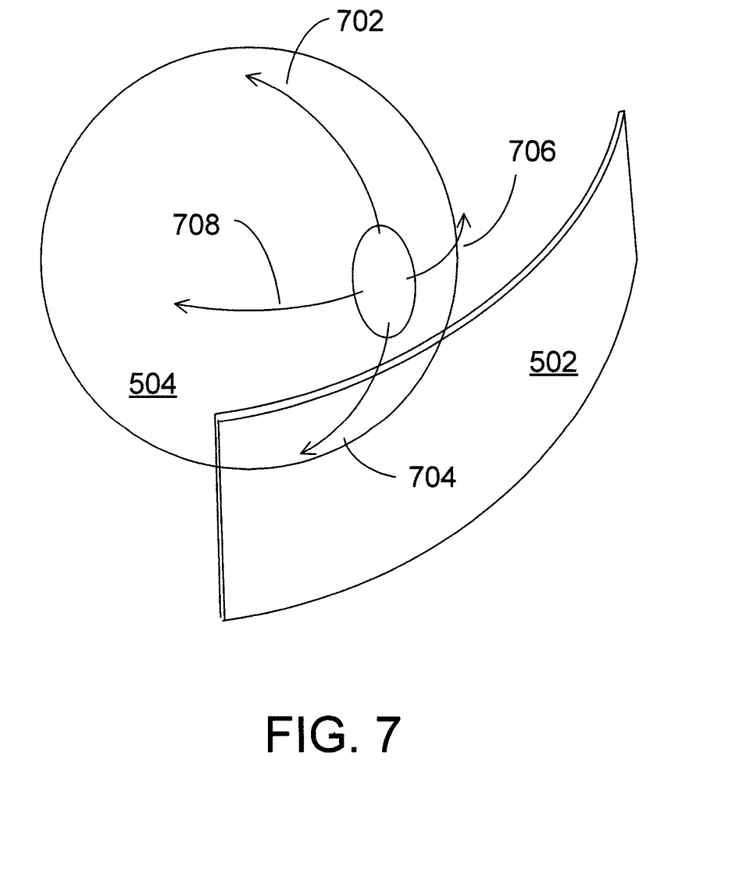
FIG. 7 is a perspective view of a lens and an eye.

Curved lenses 502 are positioned in glasses 116 so that they maintain a uniform distance D along their lengths from the center of the eyes 504. As shown in FIGS. 5C and 5D, this helps prevent shifting of the transmitted wavelengths due to a changing angle of incidence (AOI) 505 (as measured between the incident light and a normal 507 from the lens 506) as the eyeball rotates to look through the left or right edges of the glasses. Incident light 508a, 508b, and 508c passes through the lens 502 to the eye at a relatively low AOI no matter which direction it is coming from. In relatively flat glasses, e.g., with lens 506, the AOI 505 of light 508a and 508c entering the lens 506 from the sides is high (whether the viewer rotates his eyes to the side or simply sees it through his peripheral vision), while the AOI of light 508b entering the lens 506 from straight ahead is low. This will alter the frequencies admitted by the filter, as shown in FIG. 6, resulting in a ghosting and degradation of the 3D effect at the edges of the viewer's field of view. In some examples, the curvature of the lenses 502 may not be completely cylindrical, but might have a variable radius of curvature. The distance between the lens and the center of the eye should be relatively uniform, as compared to traditional flat or slightly curved lenses. In general, each lens should have a curvature centered on the center of the eye and with a radius of curvature approximately equal to the distance from the lens to the center of the eye, for example, 1.27 cm (½ inch) for lenses very close to the eye, or as much as 10.16 cm (4 inches) for lenses situated farther from the eye. Slightly curved traditional lenses typically have radii of curvature of around 30.48 cm (twelve inches).

Graph 600 shows cross-talk resulting from light passing through a flat lens at two different angles. Line 602 shows that at 0°, little of the light projected for the right-eye is admitted by a left-eye filter in the glasses. Line 604, however, shows that at 30° AOI, large peaks 606, 608 of blue and green light are transmitted at specific wavelengths. Comparing the wavelength of these peaks to the left-eye bands 202L and 204L shown in FIG. 2B, one sees that, at this angle, the left eye will be receiving light meant for the right eye. With a curved lens, all the light reaching the eye has come through the lens at a low AOI no matter what direction it came from, preventing this cross-talk.

Figure 5E:
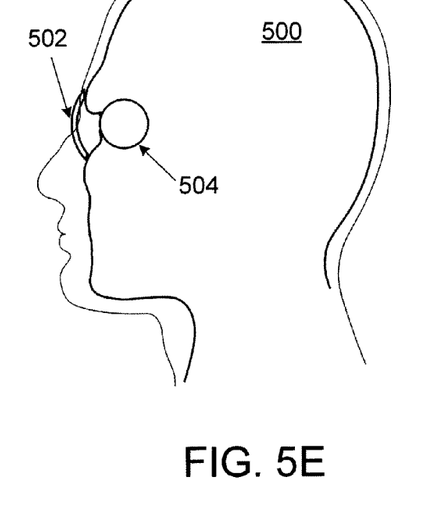
FIG. 5E is a sectional side view of glasses on a wearer's head.
Figure 5F:
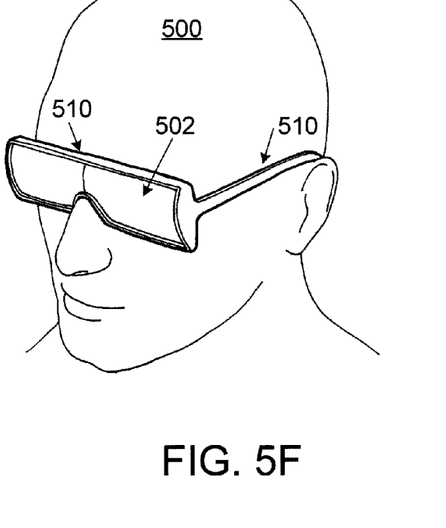

Even the thin flexible sheets used in a roll coating process are not easily curved in two directions at once, so such lenses will generally be curved in the horizontal plane, as shown in FIGS. 5A-C and 7, such that the up/down direction will still have some wavelength shift. This choice is made because the vertical range of eyeball motion (arrows 702, 704) is generally much less than the horizontal angle (arrows 706, 708). The lenses could be curved in the vertical direction, as shown in FIGS. 5E and 5D, if the nature of the projection, for example, made vertical eye movement a greater concern.

In some examples, a sputtered coating has compressive stress that contributes to a built-in curvature in the completed filter that is relatively low-stress compared to bending a substrate that starts flat. Depending on the thickness of the substrate and its material, the built-in curvature can be adjusted to the proper curvature to maintain low AOI for all horizontal angles of eyeball motion. Alternatively, the built-in curvature may get the substrate part-way to the desired shape, so that the additional curvature that must be added does not stress the coating as much as it would if the substrate were naturally flat. If the distance between the filter and the center of the eyeball is 2.54 cm (1 inch), the radius of curvature of the film should also be 2.54 cm (1 inch). This natural radius can be achieved with a sputtered coating that is deposited with typical stress values and a polycarbonate substrate that is approximately 0.20 mm (0.008 inch) thick. A filter with a PET substrate of the same thickness and the same sputtered coating has a natural radius of approximately 7.62 cm (3 inches) because it is a stiffer substrate material, but this material can bent into the 2.54 cm (1 inch) radius without degradation to the coating. Experimental reduction of the spectral shift was confirmed for a large range of horizontal eyeball angles by building glasses based on the PET substrate bent into a 2.54 cm (1 inch) radius. Other curvatures may be used, for example, giving up some image quality to allow a more comfortable fit, or to fit over prescription eye wear.

The curved lenses enabled by roll-coating the filters may be particularly advantageous in domed-screen or cylindrical-screen theaters. For example, domed screens tend to require more eyeball motion than flat screens, and roll-coated coatings allow easy curvature of the glasses to reduce ghosting due to crosstalk between eyes. Domed screens allow objects to approach the viewer from the left and right in addition to the front, and a curved lens maintains the illusion of depth even for images in the viewer's peripheral vision.

Other implementations are within the scope of the claims. For example, the filters could be configured to be attached to a wearer's existing eyeglasses.

What is claimed is:

1. Glasses for viewing a 3D stereoscopic image display comprising:
   a first lens of the glasses, the first lens comprising a first optical filter, wherein the first optical filter transmits light in a first plurality of bands of wavelengths and blocks light in a second plurality of bands of wavelengths separated in frequency from the first plurality;
   a second lens of the glasses, the second lens comprising a second optical filter, wherein the second optical filter transmits light in a third plurality of bands of wavelengths and blocks light in a fourth plurality of bands of wavelengths,
   wherein the first and third pluralities of bands of wavelengths are complementary, and the first and second lenses have a curvature in at least one of the horizontal or vertical planes such that incident light reaching the eyes of the viewer comes through the first and second lenses at a low angle of incidence, regardless of the direction of said incident light in the horizontal or vertical plane in which the lenses of the glasses are curved, and
   wherein each of the first and second optical filters of the lenses of the glasses comprises multiple layers of optical material coated onto a corresponding substrate material having a thickness of between 0.005" and 0.015".

2. The glasses of claim 1 wherein the optical material is roll coated in layers onto the substrate material, the roll-coated layers having a generally uniform thickness normal to the lens surface at points along the curvature of the lens.

3. The glasses of claim 1 wherein the substrate material is PET.

4. The glasses of claim 1 wherein the glasses have a frame, the coated substrate held in a curved shape by the frame.

5. The glasses of claim 1 wherein the first plurality of bands of wavelengths comprises a band of wavelengths around 435 nm, and the second plurality of bands of wavelengths comprises a band of wavelengths around 475 nm.

6. The glasses of claim 1 wherein the first plurality of bands of wavelengths comprises a band of wavelengths around 435 nm, a band of wavelengths around 510 nm, and a band of wavelengths around 610 nm, and the third plurality of bands of wavelengths comprises a band of wavelengths around 475 nm, a band of wavelengths around 550 nm, and a band of wavelengths around 660 nm.

7. The glasses of claim 5 wherein the fourth plurality of bands of wavelengths comprises a band of wavelengths around 435 nm, a band of wavelengths around 510 nm, and a band of wavelengths around 610 nm, and the second plurality of bands of wavelengths comprises a band of wavelengths around 475 nm, a band of wavelengths around 550 nm, and a band of wavelengths around 660 nm.

8. The glasses of claim 1 wherein the curvature is such that when the glasses is worn by a viewer such that a lens is positioned near a person's face, points along a surface of the lens, in at least one plane, are a relatively uniform distance from the eye of the viewer.

9. The glasses of claim 1 wherein the curvature is such that when the glasses is worn by a viewer such that a lens is positioned near a person's face, the radius of curvature of the lens in at least one plane is approximately equal to the distance between the coating and the center of the viewer's eye.

10. The glasses of claim 9 in which the radius of curvature is between about 1.27 cm (1/2 inch) and 10.16 cm (4 inches).

11. The glasses of claim 1, wherein the first and third pluralities of bands of wavelengths do not have any wavelengths in common above five percent of peak intensity.

12. The glasses of claim 1, further comprising a frame which maintains the curvature.

13. The glasses of claim 1, in which each of the coated substrate materials is laminated onto the corresponding substrate material, and the corresponding substrate material is formed of glass or plastic.

14. Glasses for viewing a 3D stereoscopic image display comprising:

a first lens comprising a first plurality of layers of optical materials on a first flexible substrate, wherein the first lens transmits light in a first plurality of bands of wavelengths and blocks light in a second plurality of bands of wavelengths;

a second lens comprising a second plurality of layers of optical materials on a second flexible substrate, wherein the second lens transmits light in a third plurality of bands of wavelengths and blocks light in a fourth plurality of bands of wavelengths, wherein the first and third pluralities of bands of wavelengths are complementary, and the first and second lenses are curved in at least one of the horizontal or vertical planes such that incident light reaching the eyes of the viewer comes through the first and second lenses at a low angle of incidence, regardless of the direction of said incident light in the horizontal or vertical plane in which the lenses are curved.

* * * * *